United States Patent
Guan et al.

(10) Patent No.: US 9,639,637 B2
(45) Date of Patent: May 2, 2017

(54) CONSTRUCTION OF ENTROPY-BASED PRIOR AND POSTERIOR PROBABILITY DISTRIBUTIONS WITH PARTIAL INFORMATION FOR FATIGUE DAMAGE PROGNOSTICS

(71) Applicants: Xuefei Guan, Princeton, NJ (US);
Jingdan Zhang, Plainsboro, NJ (US);
Shaohua Kevin Zhou, Plainsboro, NJ (US)

(72) Inventors: Xuefei Guan, Princeton, NJ (US);
Jingdan Zhang, Plainsboro, NJ (US);
Shaohua Kevin Zhou, Plainsboro, NJ (US)

(73) Assignee: Siemens Aktiengesellschaft, Munich (DE)

( * ) Notice: Subject to any disclaimer, the term of this patent is extended or adjusted under 35 U.S.C. 154(b) by 872 days.

(21) Appl. No.: 14/015,084

(22) Filed: Aug. 30, 2013

(65) Prior Publication Data

US 2014/0100827 A1    Apr. 10, 2014

Related U.S. Application Data

(60) Provisional application No. 61/710,872, filed on Oct. 8, 2012.

(51) Int. Cl.
*G06F 7/60* (2006.01)
*G06F 17/10* (2006.01)
*G06F 17/50* (2006.01)

(52) U.S. Cl.
CPC ...... *G06F 17/5009* (2013.01); *G06F 2217/10* (2013.01); *G06F 2217/76* (2013.01)

(58) Field of Classification Search
CPC ............ G06F 17/5009; G06F 2217/10; G06F 2217/76
USPC ............................................................. 703/2
See application file for complete search history.

(56) References Cited

U.S. PATENT DOCUMENTS

| 2003/0065454 A1* | 4/2003 | Perdue ................ G06Q 10/06 702/34 |
| 2006/0206295 A1* | 9/2006 | Tryon, III ........... G06F 17/5018 703/6 |
| 2010/0042379 A1* | 2/2010 | Minnaar ............ G06F 17/5018 703/1 |
| 2010/0235110 A1* | 9/2010 | Wang ................. G06F 17/5009 702/35 |

OTHER PUBLICATIONS

Xuefei Guan, Ratneshwar Jha, Yongming Liu, "Maximum entropy method for model and reliability updating using inspection data" ASC Structures, Structural Dynamics, and Materials Conference, Apr. 12-15, 2010. pp. 1-7.*

(Continued)

*Primary Examiner* — Dwin M Craig

(57) ABSTRACT

A method for predicting fatigue crack growth in materials includes providing a prior distribution obtained using response measures from one or more target components using a fatigue crack growth model as a constraint function, receiving new crack length measurements, providing a posterior distribution obtained using the new crack length measurements, and sampling the posterior distribution to obtain crack length measurement predictions.

18 Claims, 12 Drawing Sheets

(56) References Cited

OTHER PUBLICATIONS

A. J. McEvily "On the Quantitative Analysis of Fatigue Crack Propagation" 1983 Fatigue Mechanisms: Advances in Quantitative Measurement of Physical Damage ASTM STP 811, pp. 283-312.*
PCT International Search Report mailed Jan. 27, 2014 corresponding to PCT International Application No. PCT/US2013/062559 filed Sep. 30, 2013 (12 pages).
W.F. Wu, et al. "A Study of Stochastic Fatigue Crack Growth Modeling Through Experimental Data," Probabilistic Engineering Mechanics 18 (2003) pp. 107-118.
Ariel Caticha, et al., "Updating Probabilities," 26th International Workshop on Bayesian Inference and Maximum Entropy Methods, Jul. 8-13, 2006, pp. 1-13.
D.A. Virkler, et al., "The Statistical Nature of Fatigue Crack Propagation," Journal of Engineering Materials and Technology, vol. 101, Apr. 1979, pp. 148-153.
Xuefei Guan, et al., "Structrual Safety," Structural Safety 33 (2011) pp. 242-249.
A.J. McEvily, et al., "On the Quantitative Analysis of Fatigue Crack Propagation," American Society for Testing and Materials, 1983, pp. 283-312.
R.G. Forman, et al., "Numberical Analysis of Crack Propagation in Cyclic-Loaded Structures," Journal of Basic Engineering, Sep. 1967, pp. 459-463.
E.T. Jaynes, "Information Theory and Statiscial Mechanics, II," Physical Review, vol. 108, No. 2, Oct. 15, 1957, pp. 171-190.
P. Paris, et al., "A Critical Analysis of Crack Propagation Laws," Journal of Basic Engineering, Dec. 1963, pp. 528-533.

\* cited by examiner

| Model | $\lambda_i$ | -0.20 | -0.19 | -0.18 | -0.17 | -0.16 | -0.15 | -0.14 | -0.13 | -0.12 | -0.11 | -0.10 |
|---|---|---|---|---|---|---|---|---|---|---|---|---|
| Paris | $\bar{\alpha}_{\lambda_i}$ | 18.432 | 18.481 | 18.546 | 18.630 | 18.742 | 18.890 | 19.087 | 19.349 | 19.696 | 20.154 | 20.755 |
| Forman | $\bar{\alpha}_{\lambda_i}$ | 18.244 | 18.266 | 18.294 | 18.331 | 18.379 | 18.443 | 18.528 | 18.642 | 18.794 | 18.998 | 19.271 |
| McEvily | $\bar{\alpha}_{\lambda_i}$ | 18.265 | 18.290 | 18.321 | 18.361 | 18.413 | 18.484 | 18.574 | 18.697 | 18.858 | 19.077 | 19.372 |

| Model | $\lambda_i$ | -0.04 | -0.038 | -0.036 | -0.034 | -0.032 | -0.03 | -0.028 | -0.026 | -0.024 | -0.022 | -0.02 |
|---|---|---|---|---|---|---|---|---|---|---|---|---|
| Paris | $\overline{\alpha}_{\lambda_i}$ | 11.218 | 11.599 | 12.096 | 12.742 | 13.583 | 14.676 | 16.093 | 17.921 | 20.263 | 23.238 | 26.976 |
| Forman | $\overline{\alpha}_{\lambda_i}$ | 10.062 | 10.222 | 10.431 | 10.706 | 11.065 | 11.538 | 12.157 | 12.968 | 14.027 | 15.407 | 17.193 |
| McEvily | $\overline{\alpha}_{\lambda_i}$ | 10.185 | 10.358 | 10.584 | 10.880 | 11.267 | 11.775 | 12.439 | 13.308 | 14.442 | 15.914 | 17.817 |

CONSTRUCTION OF ENTROPY-BASED PRIOR AND POSTERIOR PROBABILITY DISTRIBUTIONS WITH PARTIAL INFORMATION FOR FATIGUE DAMAGE PROGNOSTICS

CROSS REFERENCE TO RELATED UNITED STATES APPLICATIONS

This application claims priority from "Construction of Entropy-Based Prior and Posterior Probability Distributions with Partial Information for Fatigue Damage Prognostics", U.S. Provisional Application No. 61/710,872 of Guan, et al., filed Oct. 8, 2012, the contents of which are herein incorporated by reference in their entirety.

TECHNICAL FIELD

This application is directed to methods for probabilistic fatigue prognostics using partial information, in situations where only one or two measurement points available.

DISCUSSION OF THE RELATED ART

Fatigue damage of materials exhibits significant uncertainties and require probabilistic methods for reliable prognostics. Uncertainties in fatigue prognostics come from uncertain material properties, applied random loading histories, environmental conditions, and component geometric dimensions. There are many crack growth laws that attempt to describe the crack growth rate curve, which are usually semi or entirely empirical functions that have been fitted to a set of data, such as Paris' model, Forman's equation, and McEvily's equation. Extensive experimental data are required for a reliable calibration of model parameters, especially for probabilistic analysis. This calibration is expensive since fatigue testing is usually very time-consuming. In addition, model prediction becomes unreliable when usage conditions are noticeably different from the well-controlled laboratory conditions under which the model parameters are calibrated. Therefore, accurate deterministic fatigue damage prediction is challenging to achieve under realistic service conditions.

A viable solution is to use probabilistic modeling to take all these uncertainties into account and update the model using response measure and/or usage information for the target system. The updating scheme can be based on Bayes' theorem or the principle of Maximum relative Entropy (MrE). Both approaches need a prior probability distribution in the formulations. In fatigue analysis, both the Bayesian method and the maximum entropy approach have been used for fatigue prognosis model updating, but they generally use prior distributions identified from a large set of experimental data. Whether to choose or derive a prior distribution depends on what information is available. Experimental testing and statistical analysis can give a reasonable description for model parameter distributions but a large set of repeated testing under the same condition is required, which is expensive. This information can serve as prior distributions for further prognostics under the same or similar usage conditions. Additional testing is needed for parameter estimation when applying these models in different conditions. Due to infinite number of combinations of actual usage conditions, this approach can be challenging to implement for realistic situations.

Another approach, in the absence of any information, is to construct a homogeneous/uniform probability distribution that assigns to each region of the parameter space a probability proportional to the volume of that region, which is also called a non-informative prior in a Bayesian context. However, some non-informative priors cannot be normalized. In such cases, methods based on the transformation group or a reference prior can be adopted, but an analysis of the specific task is needed. Partial information, such as the mathematical expectation for a specific function involving model parameters, is sometimes available from historical data or field testing. The inclusion of the partial information is challenging in the classical Bayesian framework. The Maximum Entropy principle (MaxEnt) is a way of assigning an initial probability given a set of constraints. The principle states that, subject to known constraints, the probability distribution that represents the current state of knowledge is the one that has the largest information entropy. Entropy-based prior distribution construction can include the partial information in the constraint and can allow the information to be fused with future damage prognostics. Once the prior distribution is derived, the subsequent updating is straight forward using Bayes' theorem or the principle of MrE. However, there have been few few studies that use partial information to construct the prior distribution in fatigue damage prognostics.

SUMMARY

Exemplary embodiments of the invention as described herein generally include systems and methods for formulating the prior and posterior distributions for probabilistic inference using partial information. According to embodiments of the disclosure, a prior distribution for the model parameters can be derived according to the principle of Maximum Entropy (MaxEnt), incorporating the partial information as constraints. A posterior distribution is formulated using the principle of Maximum relative Entropy (MrE) to perform probabilistic updating and prognostics when new information is available. The partial information for building the prior distribution is retrieved from the first response measurement on a limited number of target to systems where the statistical identification of model parameters is unavailable using traditional regression methods. A simulation-based method can be used to calculate the asymptotic solution for the entropy-based prior distribution. Once the prior is obtained, subsequent measurement data are used to update using Markov Chain Monte Carlo simulations. Fatigue crack prognosis examples with experimental data are presented for demonstration and validation.

According to an aspect of the invention, there is provided a method for predicting fatigue crack growth in materials, including providing a prior distribution obtained using response measures from one or more target components using a fatigue crack growth model as a constraint function, receiving new crack length measurements, providing a posterior distribution obtained using the new crack length measurements, and sampling the posterior distribution to obtain crack length measurement predictions.

According to a further aspect of the invention, the posterior distribution is sampled using a Markov-chain Monte-Carlo simulation.

According to a further aspect of the invention, the prior distribution is expressed as $p_0(\theta) \propto \exp\{\lambda M(\theta)\}$, where M is the fatigue crack growth model, $\theta$ is a fatigue crack growth model parameter, $M(\theta)$ is the output of the fatigue crack growth model, and $\lambda$ is a Lagrange multiplier, and the constraint function is expressed as $E_{p_0(\theta)}[M(\theta)]=\bar{\alpha}$, where $\bar{\alpha}$ is a mean of the response measures from one or more target components.

According to a further aspect of the invention, the Lagrange multiplier $\lambda$ is obtained by solving $$\frac{\partial \ln \int \lambda M(\theta) d\theta}{\partial \lambda} = \bar{a}.$$

According to a further aspect of the invention, the posterior distribution is expressed as $$p(\theta) \propto \exp[\lambda M(\theta)] \exp\left\{-\frac{1}{2}\sum_{i=1}^{n}\left[\frac{a_i - M_i(\theta)}{\sigma_\varepsilon}\right]^2\right\},$$

where $a_i$ represents new crack length measurements associated with the one or more target components, $\sigma_\varepsilon$ is a standard deviation of Gaussian likelihood, and n is a total number of new crack length measurements.

According to a further aspect of the invention, $\sigma_\varepsilon = \sqrt{\sigma_{\varepsilon_1}^2 + \sigma_{\varepsilon_2}^2}$, where $\sigma_{\varepsilon_1}$ is a standard deviation associated a statistical uncertainty of the fatigue crack growth model M, and $\sigma_{\varepsilon_2}$ is a standard deviation associated with a measurement uncertainty.

According to a further aspect of the invention, the method includes updating the posterior distribution as new crack length measurements are received.

According to a further aspect of the invention, the fatigue crack growth model is Paris' model, expressed as $$\frac{da}{dN} = c(\Delta K)^m,$$

where a is a crack size, N is a number of applied cyclic loads, $$\Delta K = \sqrt{\pi a}\, \Delta\sigma g\left(\frac{a}{w}\right)$$

is a range of a stress intensity factor during one cycle, $\Delta\sigma$ is a range of the applied stress during one cycle, g(a/w) is a geometric correction term, w is a width of the specimen, and c and m are model parameters.

According to a further aspect of the invention, the fatigue crack growth model is Forman's model, expressed as $$\frac{da}{dN} = \frac{c(\Delta K)^m}{(1-R)K_{cr} - \Delta K},$$

where a is a crack size, N is a number of applied cyclic loads, $$\Delta K = \sqrt{\pi a}\, \Delta\sigma g\left(\frac{a}{w}\right)$$

is a range of a stress intensity factor during one cycle, $\Delta\sigma$ is a range of the applied stress during one cycle, g(a/w) is a geometric correction term, w is a width of the specimen, $K_{cr}$ is a fracture toughness of the material, R is a load ratio, and c and m are model parameters.

According to a further aspect of the invention, the fatigue crack growth model is McEvily's model, expressed as $$\frac{da}{dN} = c(\Delta K - \Delta K_{th})^2\left[1 - \frac{\Delta K}{K_{cr} - K_{max\square}}\right],$$

where a is a crack size, N is a number of applied cyclic loads, $$\Delta K = \sqrt{\pi a}\, \Delta\sigma g\left(\frac{a}{w}\right)$$

is a range of a stress intensity factor during one cycle, $\Delta\sigma$ is a range of the applied stress during one cycle, g(a/w) is a geometric correction term, w is a width of the specimen, $K_{cr}$ is a fracture toughness of the material, $\Delta K_{th}$ is a threshold stress intensity range below which cracks either propagate at an extremely low rate or do not propagate at all, $K_{max}$ is a maximum stress intensity in one cyclic to load, and c is a model parameter.

According to another aspect of the invention, there is provided a method for predicting fatigue crack growth in materials, including providing a prior distribution subject to a constraint function obtained using response measures from one or more target components, where the prior distribution is expressed as $p_0(\theta) \propto \exp\{\lambda M(\theta)\}$, where M is the fatigue crack growth model, $\theta$ is a fatigue crack growth model parameter, $M(\theta)$ is the output of the fatigue crack growth model, and $\lambda$ is a Lagrange multiplier is obtained by solving $$\frac{\partial \ln \int \lambda M(\theta) d\theta}{\partial \lambda} = \bar{a},$$

where $\bar{\alpha}$ is a mean of the response measures from one or more target components, and a constraint function is expressed as $E_{p_0(\theta)}[M(\theta)]=\bar{\alpha}$.

According to a further aspect of the invention, the method includes receiving new crack length measurements, providing a posterior distribution obtained using the new crack length measurements, where the posterior distribution is expressed as $$p(\theta) \propto \exp[\lambda M(\theta)] \exp\left\{-\frac{1}{2}\sum_{i=1}^{n}\left[\frac{a_i - M_i(\theta)}{\sigma_\varepsilon}\right]^2\right\},$$

where $a_i$ represents new crack length measurements associated with the one or more target components, $\sigma_\varepsilon = \sqrt{\sigma_{\varepsilon_1}^2 + \sigma_{\varepsilon_2}^2}$ is a standard deviation of Gaussian likelihood where $\sigma_{\varepsilon_1}$ is a standard deviation associated a statistical uncertainty of the fatigue crack growth model M and $\sigma_{\varepsilon_2}$ is a standard deviation associated with a measurement uncertainty, and n is a total number of new crack length measurements; and updating the posterior distribution as new crack length measurements are received.

According to a further aspect of the invention, the method includes sampling the posterior distribution to obtain crack length measurement predictions, where the posterior distribution is sampled using a Markov-chain Monte-Carlo simulation.

According to another aspect of the invention, there is provided a non-transitory program storage device readable by a computer, tangibly embodying a program of instructions executed by the computer to perform the method steps for predicting fatigue crack growth in materials.

DETAILED DESCRIPTION OF EXEMPLARY EMBODIMENTS

Figures 1, 2:
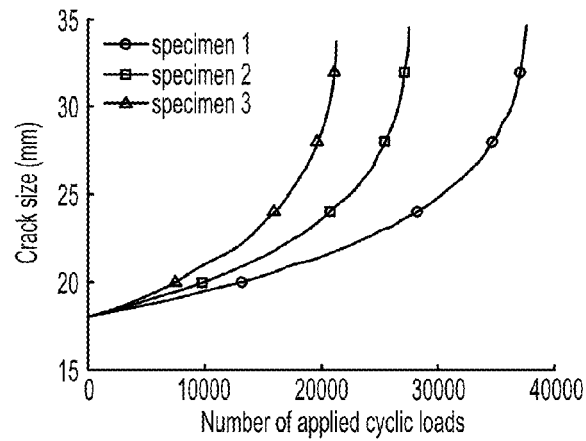
FIG. 1 depicts three crack growth curves of compact tension specimens, according to an embodiment of the disclosure.
FIG. 2 is a table of values of $\bar{\alpha}_{\lambda_i}$ for different $\lambda_i$ for compact tension specimen testing, according to an embodiment of the disclosure.

Exemplary embodiments of the invention as described herein generally provide systems and methods for probabilistic fatigue prognostics using partial information. While embodiments are susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

Entropy-Based Prior and Posterior Distributions

According to embodiments of the disclosure, entropic prior and posterior distributions can be derived based on basic principles of information theory to include uncertainties arising from model parameters and the response measures. One can construct a prior distribution using the first response measure associated with a limited number of target systems where the model parameter point estimate and statistical identifications are essentially unavailable. The mean value of the first response measures associated with each individual target system can be treated as a mathematical expectation of the mechanism model output. The expectation value can be formulated as the constraint of the prior distribution using the principle of Maximum Entropy (MaxEnt). The posterior distribution is derived when new information is available. The posterior distribution is derived using the new response measures based on the principle of Maximum relative Entropy (MrE).

Prior Distribution Formulation Using the Principle of MaxEnt

Given a random variable $\theta$ and its probability distribution $p(\theta) \in R^+$, the information entropy of $\theta \in \Theta$ is defined as $$H(\theta) = -\int_\Theta p(\theta) \ln p(\theta) d\theta \quad (1)$$

The principle of Maximum Entropy states that a desired probability distribution is the one that maximizes the entropy subject to all constraints. The usual constraints are the mathematical expectations of some function that involve the variable $\theta$. For example, the first and second order moments of $\theta$, such as $E_{p(\theta)}[\theta]$ and $E_{p(\theta)}[\theta^2]$, or more generally $E_{p(\theta)}[f(\theta)]$ can serve as the constraints. The desired prior distribution $p(\theta)$ can be derived using the method of Lagrange multipliers. Given a general expectation constraint $E_{p(\theta)}[f(\theta)]=F$, the Lagrangian $\Lambda$ reads $$\Lambda = -\int_\Theta p(\theta) \ln p(\theta) d\theta + \alpha[-\int_\Theta p(\theta) d\theta - 1] + \lambda[-\int_\Theta p(\theta) f(\theta) d\theta - F] \quad (2)$$

According to embodiments of the disclosure, $\Lambda$ can be maximized using $$\frac{\delta \Lambda}{\delta p(\theta)} = 0$$

to obtain $$p(\theta) = \frac{1}{Z} \exp\{\lambda f(\theta)\}, \quad (3)$$

where Z is the normalization constant and $\alpha$ and $\lambda$ are Lagrange multipliers. According to embodiments of the disclosure, the term $\lambda$ can be calculated by solving $$\frac{\partial \ln\left[\int_\theta [\exp(\lambda f(\theta)) d\theta]\right]}{\partial \lambda} = F \quad (4)$$

A solution according to embodiments of the disclosure also holds true when $\theta$ is a vector of variables and $f(\theta)$ is a set of real-valued functions. For polynomial type functions, such as $$f_k(\theta) = \sum_{j=0}^{k} a_j \theta^j,$$

EQ. (3) has an analytical expression when $k \leq 2$. Higher order moments constraints or more complicated function forms can be solved by numerical methods. System level full scale fatigue testing is expensive, and it is challenging to obtain a sufficient number of tests for parameter regression and statistical identifications. In such cases, according to embodiments of the disclosure, a mechanism model can be used as the function in the constraint $E_{p(\theta)}(f(\theta))=F$ and the mean value of the first measure associated with a limited number of target systems can be treated as the expectation of model predictions. In this way, partial information to from a limited number of tests can still be used for prior distribution construction.

Posterior Distribution Formulation Using the Principle of MrE

According to embodiments of the disclosure, once a prior distribution is constructed, the posterior distribution can be calculated using the principle of MrE. Let $p_0(\theta)$ be a prior distribution of the parameter under model M. Probabilistic updating of $p_0(\theta)$ can be performed when new information is available. The information may be a response measure and/or the mathematical expectation of a function of $\theta$. Let $p(x|\theta)$ be the conditional probability distribution of observation $x \in X$ given $\theta$. The joint distribution of x and $\theta$ is $p_0(x, \theta) = p_0(\theta)p(x|\theta)$. Let $p(x, \theta)$ be an optimal posterior distribution given new information used as constraints. The search space for this optimal distribution is $X \times \Theta$. The relative information entropy, or equivalently, the mathematical form of KullbackLeibler (KL) divergence, of the desired optimal posterior distribution $p(x, \theta)$ with respect to the prior distribution of $p_0(x, \theta)$ is defined as $$KL(p\|p_\downarrow 0) = \int_\downarrow (X \times \Theta) [p(x,\theta)\ln(p(x,\theta))/(p_\downarrow 0(x,\theta))]dxd\theta \quad (5)$$

The principle of Maximum relative Entropy states that, given new facts, a new distribution $p(x, \theta)$ should be chosen which is as close to the original distribution $p_0(x, \theta)$ as possible. The method of Lagrange multipliers can be used to obtain $p(x, \theta)$ by minimizing EQ. (5) given constraints. The direct response measure of the event $x=x'$ can be formulated as the constraint $\int_\Theta p(x, \theta)d\theta = \delta(x-x')$. Combining with a normalization constraint $\int_{X \times \Theta} p(x, \theta)dxd\theta = 1$, the Lagrangian can be expressed as $$\Lambda = \int_{x \times \theta} \frac{p(x, \theta)\ln p(x, \theta)}{p_0(x, \theta)} dxd\theta + \alpha\left[\int_{x \times \theta} p(x, \theta)dxd\theta - 1\right] + \int_x \beta(x)\left[\int_{x \times \theta} [p(x, \theta)dx - \delta(x-x')]dx\right]$$

The optimal posterior distribution $p(x, \theta)$ is obtained by $$\frac{\delta \Lambda}{\delta p(x, \theta)} = 0$$

as $$p(x, \theta) = \frac{1}{Z_0} p_0(x, \theta)\exp[-\beta(x)] \quad (7)$$

where $$Z_0 = \int_{x \times \theta} p_0(x, \theta)\exp[-\beta(x)]dxd\theta$$

is the normalization constant. Substituting $p(x, \theta)$ in EQ. (7) into the constraint $\int_\Theta p(x, \theta)d\theta = \delta(x-x')$ and integrating over $\theta$ yields $$p(\theta) \propto p_0(\theta)p(x'|\theta), \quad (8)$$

which is identical to the usual Bayesian posterior distribution for $\theta$ given the response measure $x'$.

Construction of the Likelihood Function

According to embodiments of the disclosure, a general Gaussian likelihood function can be formulated for general fatigue damage prognostics tasks. According to embodiments of the disclosure, a mechanism model can be used to construct the likelihood function ($\propto p(x_0|\theta)$) in EQ. (8).

Denote the deterministic model prediction for event (response measure) x as M. Considering the statistical mechanism modeling uncertainty $\epsilon_1$ and the measurement uncertainty $\epsilon_2$, the probabilistic description of x can be expressed as $$x = M(\theta) + \epsilon_1 + \epsilon_2 \quad (9)$$

Without loss of generality, terms $\epsilon_1$ and $\epsilon_2$ are usually described by independent Gaussian variables with the standard deviations of $\sigma_{\epsilon_1}$ and $\sigma_{\epsilon_2}$, respectively. According to embodiments of the disclosure, a likelihood function for independent response measures can be formulated as $$p(x_1, x_2, \ldots, x_n | \theta) = \frac{1}{[\sqrt{2\pi}\sigma_\varepsilon]^n} exp\left\{-\frac{1}{2}\sum_{i=1}^n \left[\frac{x_i - M_i(\theta)}{\sigma_\varepsilon}\right]^2\right\}. \quad (10)$$

where $\sigma_1 = \sqrt{\sigma_{\epsilon_1}^2 + \sigma_{\epsilon_2}^2}$. Substituting EQ. (3) for the prior distribution and EQ. (10) for the likelihood function into EQ. (8), the posterior distribution now is $$p(\theta) \propto \exp[\lambda f(\theta)]\exp\left\{-\frac{1}{2}\sum_{i=1}^n \left[\frac{x_i - M_i(\theta)}{\sigma_\varepsilon}\right]^2\right\} \quad (11)$$

If sufficient experimental data are available, function $f(\theta)$ can be chosen to be $\theta$ or $\theta^2$ and the prior distribution becomes the commonly used exponential family distribution. For example, given $E_{p(\theta)}[\theta] = \phi_1$ and $E_{p(\theta)}[\theta^2] = \phi_2$, the prior distribution $\exp[\lambda f(\theta)]$ is the usual normal distribution with the mean value of $\phi_1$ and variance of $\phi_2 - \phi_1^2$. For realistic system and structures, several issues must be addressed. First, the direct statistical identification of $\theta$ may be challenging to apply because the response measures are usually not $\theta$ but rather some indirect variables. Second, the accurate statistical identification of $\theta$ may also use a large set of experimental data. Based on those considerations, a response measure prediction model $M(\theta)$ according to embodiments of the disclosure is used for $f(\theta)$ in the prior distribution. The posterior distribution becomes, $$p(\theta) \propto \exp[\lambda M(\theta)]\exp\left\{-\frac{1}{2}\sum_{i=1}^n \left[\frac{x_i - M_i(\theta)}{\sigma_\varepsilon}\right]^2\right\} \quad (12)$$

In many engineering tasks, the parameter $\theta$ is multi-dimensional and direct evaluation of EQ. (4) for the Lagrange multiplier $\lambda$ in the prior distribution is challenging. More general numerical methods, such as Monte Carlo simulation, are usually used.

Fatigue Crack Growth Prognostics

To illustrate and validate a procedure according to embodiments of the disclosure for building the entropic prior and posterior for fatigue damage prognostics, a practical example with experimental data is presented. Fatigue crack damage propagation is a major failure mode for many engineering systems and the damage state and the crack growth should be quantified to avoid catastrophic events. Many fatigue crack growth models are semi-empirical because the underlying mechanism are either too sophisticated to be modeled exactly or the resulting models are too computationally intensive for practical use. Therefore, updating parameters using measurement data has become an effective and efficient way to reduce prognostic uncertainties. In practice, fatigue crack growth model parameters are usually obtained through standard testing. In standard testing, the geometry of a specimen has a specific configuration. The parameter value obtained in this manner is not generic and should not be used for other geometric or loading configurations, and using a parameter value obtained in one dataset with a different geometric and loading configuration may lead to unreliable results. On the other hand, testing a target component of interest may be impractical due to the economic and time constraints.

According to embodiments of the disclosure, a practical fatigue crack growth example is presented based on the above considerations. First, given no testing data, a prior is directly obtained using response measures from a limited number of target components using a fatigue crack growth model according to embodiments of the disclosure as the constraint function. The prior can reflect uncertainties associated with the target components as a whole. Then subsequent measurement data associated with the target component of interest can be used to perform updating. According to embodiments of the disclosure, updating uses component-specific measurement data and the updated results become more specific as more data are used in the updating process. Eventually, the measurement data diminish the effects of the prior information and become more relevant to the target component.

Figure 13:
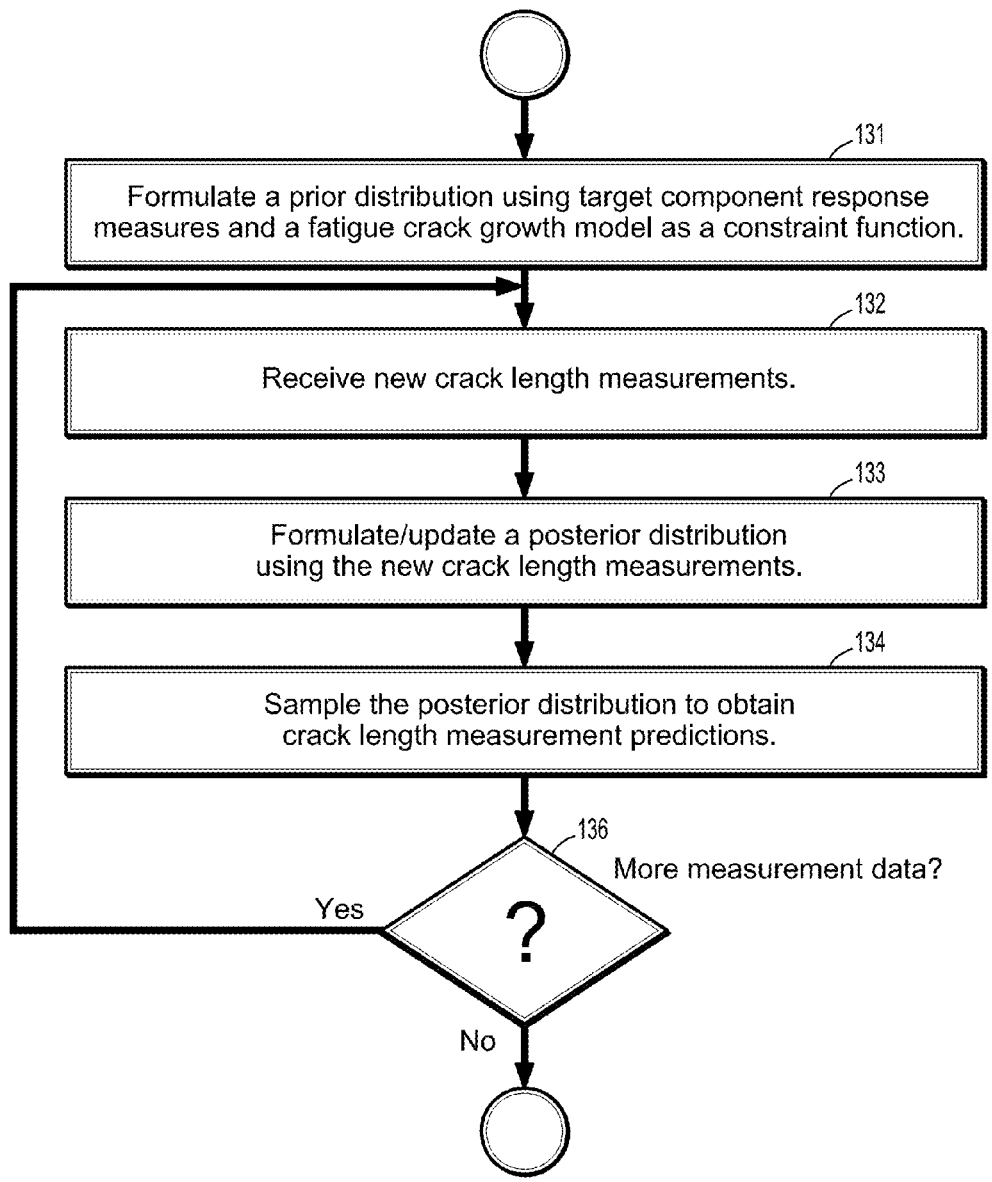
FIG. 13 is a flow chart of a method for probabilistic fatigue prognostics using partial information, according to an embodiment of the disclosure.

A flowchart of a method according to embodiments of the disclosure for predicting fatigue crack growth in materials is presented in FIG. 13. Referring now to the figure, a method begins at step 131 by formulating a prior distribution obtained using response measures from one or more target components using a fatigue crack growth model as a constraint function. The prior distribution is expressed as $p_0(\theta) \propto \exp\{\lambda M(\theta)\}$, where M is the fatigue crack growth model, $\theta$ is a fatigue crack growth model parameter, $M(\theta)$ is the output of the fatigue crack growth model, and $\lambda$ is a Lagrange multiplier obtained by solving $$\frac{\partial \ln \int \lambda M(\theta) d\theta}{\partial \lambda} = \bar{a}.$$

The constraint function is expressed as $E_{p_0(\theta)}[M(\theta)] = \bar{\alpha}$, where $\bar{\alpha}$ is a mean of the response measures from one or more target components. At step 132, new crack length measurements are received. These new crack length measurements are used at step 133 to formulate a posterior distribution, expressed as $$p(\theta) \propto \exp[\lambda M(\theta)] \exp\left\{-\frac{1}{2} \sum_{i=1}^{n} \left[\frac{a_i - M_i(\theta)}{\sigma_\varepsilon}\right]^2\right\},$$

where $a_i$ represents new crack length measurements associated with the one or more target components, $\sigma_\varepsilon$ is a standard deviation of Gaussian likelihood, $\sigma_\varepsilon = \sqrt{\sigma_{\varepsilon_1}^2 + \sigma_{\varepsilon_2}^2}$, where $\sigma_{\varepsilon_1}$ is a standard deviation associated a statistical uncertainty of the fatigue crack growth model M and $\sigma_{\varepsilon_2}$ is a standard deviation associated with a measurement uncertainty, and n is a total number of new crack length measurements. The posterior distribution is sampled at step 134 to obtain crack length measurement predictions. If, at step 135, it is determined that there are more measurements to be processed, the method returns to step 132 to receive the new crack length measurements. Steps 133 and 134 are then repeated, incorporating the new measurements to update the posterior distribution.

To demonstrate the applicability of a method according to embodiments of the disclosure, three commonly used fatigue crack growth models are included in this example. Two experimental datasets are used to validate the effectiveness of a method according to embodiments of the disclosure.

Fatigue Crack Growth Models

Three commonly used fatigue crack growth models, namely Paris' model, Forman's model, and McEvily's model, are used here to demonstrate the applicability of a method according to embodiments of the disclosure. The three models are briefly introduced for completeness.

Paris' model is given as $$\frac{da}{dN} = c(\Delta K)^m, \tag{13}$$

where a is the crack size, N is the number of applied cyclic loads, and c and m are model parameters. Following convention, parameter ln(c) is generally used instead of c when fitting the model parameters. The term $$\Delta K = \sqrt{\pi a} \, \Delta \sigma g\left(\frac{a}{w}\right)$$

is the range of the stress intensity factor during one cycle. The term $\Delta \sigma$ is the range of the applied stress during one cycle, g(a/w) is the geometric correction term, and w is the width of the specimen. Paris' model describes a log-log linear region in the $$\frac{da}{dN} \sim \Delta K$$

coordinate.

Forman's model is stated as $$\frac{da}{dN} = \frac{c(\Delta K)^m}{(1-R)K_{cr} - \Delta K}, \tag{14}$$

where a, N, and $\Delta K$ are defined as before. R is the load ratio and $K_{cr}$ is the fracture toughness of the material. c and m are two parameters of Forman's model.

McEvily's model is defined as $$\frac{da}{dN} = c(\Delta K - \Delta K_{th})^2 \left[1 - \frac{\Delta K}{K_{cr} - \max}\right], \tag{15}$$

where a, N, $\Delta K$, and $K_{cr}$ are defined as before. $\Delta K_{th}$ is the threshold stress intensity range below which cracks either propagate at an extremely low rate or do not propagate at all. Knowledge of $\Delta K_{th}$ permits the calculation of permissible crack lengths and applied stresses to avoid fatigue crack growth. $K_{max}$ is the maximum stress intensity in one cyclic load and c is the model parameter. It should be noted that parameters c and m take different values in different models and they are usually obtained from experimental data via regression analysis. For convenience, the logarithm of parameter c, ln(c), is generally used instead of c for parameter identification.

Statistical identification of the parameters generally uses a large number of experimental tests under the same conditions. If only a limited number of crack growth curves are available, e.g., 2 or 3 curves, the statistical identification for the model parameters is challenging, especially for the variance. This scenario is typical for practical problems where a component is usually different from the standard testing specimen. However, a mean crack measurement can be a reasonable approximation for the mathematical expectation of a model prediction. Therefore, according to embodiments of the disclosure, the constraint can be formulated as $E_{p_0(\theta)}[M(\theta)]=\overline{\alpha}$, where $\overline{\alpha}$ is the mean value of the crack size measures, and the prior distribution can be expressed, according to EQ. (3), as $$p_0(\theta) \propto \exp\{\lambda M(\theta)\}, \quad (16)$$

where $\theta$ is the model parameter, M is the model, and $M(\theta)$ is the output of the model. For example, using Paris' model, $\theta=(\ln(c), m)$ and M is EQ. (13), and $M(\theta)$ gives the result by solving EQ. (13). $p_0(\theta)$ is the prior distribution of the model parameter and $E_{p_0(\theta)}[M(\theta)]$ represents the mathematical expectation of $M(\theta)$ under the distribution of $p_0(\theta)$. The Lagrange multiplier $\lambda$ is obtained by solving $$\frac{\partial \ln \int \lambda M(\theta) d\theta}{\partial \lambda} = \overline{a}. \quad (17)$$

Compact Tension Specimen Testing Data and Prognostics

Tests of embodiments of the disclosure used the experimental testing data reported in Wu, et al., "A study of stochastic fatigue crack growth modeling through experimental data", Probabilistic Engineering Mechanics 2003, 18(2):107-118, the contents of which are herein incorporated by reference in their entirety. This testing data includes crack growth trajectories for 2024 T351 aluminum alloy compact tension (CT) specimens. The dimensions of the specimens are 50.0 mm wide and 12.0 mm thick, with nominal yield strength and ultimate yield strength of 320 MPa and 462 MPa, respectively. The initial crack length is 18.0 mm.

Sinusoidal signals with the maximum force of 4.5 kN and the minimal force of 0.9 kN are used as the input loads. The loading frequency is 15 Hz. To reflect the largest specimen uncertainty, three crack growth curves with a fastest, a moderate, and a slowest crack growth rate are chosen from the dataset to represent the only available experimental data. The three crack growth curves of the compact tension specimens are shown in FIG. 1.

According to embodiments of the disclosure, assume the crack size for the three specimens at 10,000 cycles are measured and the results are 18.71 mm, 18.92 mm, and 19.19 mm associated with the slow, medium and fast rate curves, respectively. With this information only, i.e. the first response measure for the three specimens, deterministic values for the parameters of Paris' model for the three specimens cannot be obtained since the number of unknowns is larger than the number of measured points. However, an entropic prior distribution according to embodiments of the disclosure can be constructed according to EQ. (16) and EQ. (17) by treating the mean values of the three crack measures as the expectation of the Paris model predictions. Therefore, in EQ. (17), $\overline{\alpha}=(18.71+18.92+19.19)/3=18.94$ mm. In the case where only one measurement point is available for each of those models, a classical statistical and deterministic method for parameter estimation is challenging to apply because the number of unknowns is larger than the minimal required data points. For example, Paris' model has two parameters (ln(c), m) whereas only one equation is available: $M(\ln(c), m)=18.71$ mm Solving for the Lagrange multiplier $\lambda$ in EQ. (17) is by nature an optimization task, to which classical gradient based optimization algorithms can be directly applied. For tasks with a small number of parameters, numerical quadrature can obtain the integral of $\int \lambda M(\theta) d\theta$ in EQ. (17) for a given value of $\lambda$. For tasks with a large number of parameters, simulation-based methods can be used to evaluate the integral. Since the solution of $\lambda$ is unique, interpolation can also be adopted to reduce the total number of integral evaluations. Denote the value of $E_{p_0(\theta)}[M(\theta)]$ associated with a specific value of $\lambda$ as $\overline{\alpha}_\lambda$. Given $\lambda$ and taking a set of different values, the corresponding $\overline{\alpha}_\lambda$ can be obtained either by numerical quadrature or simulation-based methods. Therefore, given the actual measured value of $\overline{\alpha}=18.94$ mm, the desired solution for $\lambda$ can be interpolated. According to embodiments of the disclosure, a numerical quadrature with interpolation is used to obtain the Lagrange multiplier $\lambda$. Due to practical and empirical considerations of the model parameters, ln(c) is bounded in the range [−35, −5] and m is bounded by [1, 5]. According to embodiments of the disclosure, to interpolate the Lagrange multiplier $\lambda$ associated with $\overline{\alpha}=18.94$ mm, a set of $\lambda_i$ uniformly sampled from [−0.2, −0.1] is used in EQ. (17) to evaluate the corresponding $\overline{\alpha}_{\lambda_i}$. According to embodiments of the disclosure, $\overline{\alpha}_{\lambda_i}$ for different $\lambda_i$ can be calculated using the quadrature package in MATLAB 2008a. Results are shown in the table of FIG. 2.

For $\overline{\alpha}=18.94$ mm, the corresponding $\lambda$ is obtained from interpolation as −0.1471, −0.1126, and −0.1158 for Paris' model, Forman's model, and McEvily's model, respectively. The general posterior distribution for multiple response measures can then be written as $$p(\theta) \propto \exp[\lambda M(\theta)] \exp\left\{-\frac{1}{2} \sum_{i=1}^{n} \left[\frac{a_i - M_i(\theta)}{\sigma_\varepsilon}\right]^2\right\}, \quad (18)$$

where $a_i$ is the subsequent new crack length measurement data associated with the target component, $\sigma_\varepsilon$ is the standard deviation of Gaussian likelihood, and n is the total number of subsequent measures of crack size. For example, using Paris' model, $\theta=(\ln(c), m)$ and $\lambda=-0.1471$.

According to embodiments of the disclosure, three measurement data points are arbitrarily chosen to represent the actual measures of crack sizes. Those data are used for updating using the posterior distribution in EQ. (18). Once a new measurement is available, simulations such as a Markov chain Monte Carlo (MCMC) with the Metropolis-Hastings algorithm can be used to draw samples from the posterior distribution. The fatigue crack growth prognostics can be evaluated using the resulting MCMC samples. According to embodiments of the disclosure, at each updating, 250,000 samples are generated. For the purpose of illustration, the term $\sigma_\varepsilon$ is explicitly set to 0.30 mm for general fatigue prognostic tasks. Alternatively, the actual value for $\sigma_\epsilon$ can be estimated using historical data or the calibration uncertainty of the measurement equipment.

Figure 3:
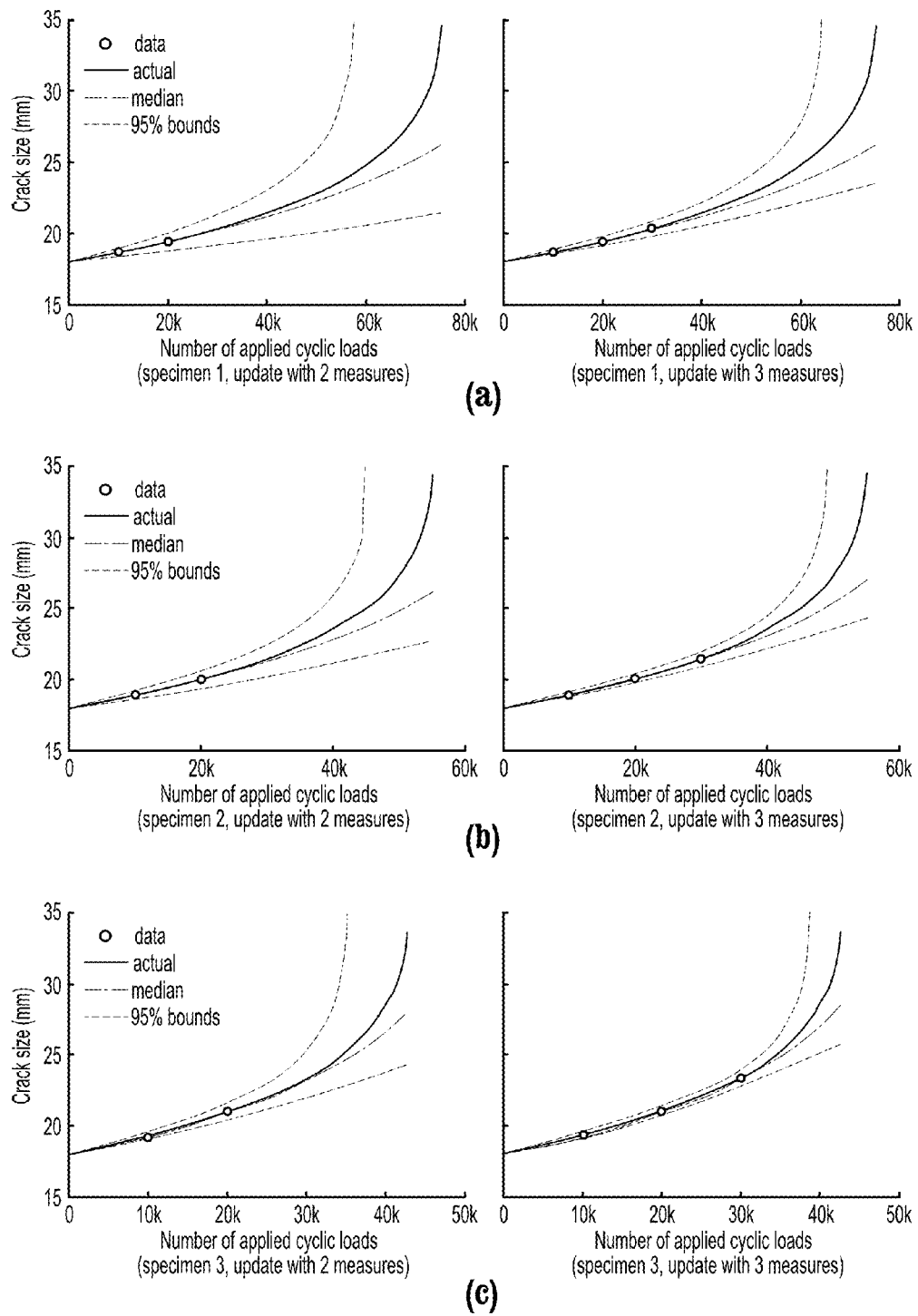
FIGS. 3(a)-(c), 4(a)-(c), and 5(a)-(c) depict fatigue crack growth prognostics update using Paris' model, Forman's model, and McEvily's model, respectively, according to an embodiment of the disclosure.
Figure 4:
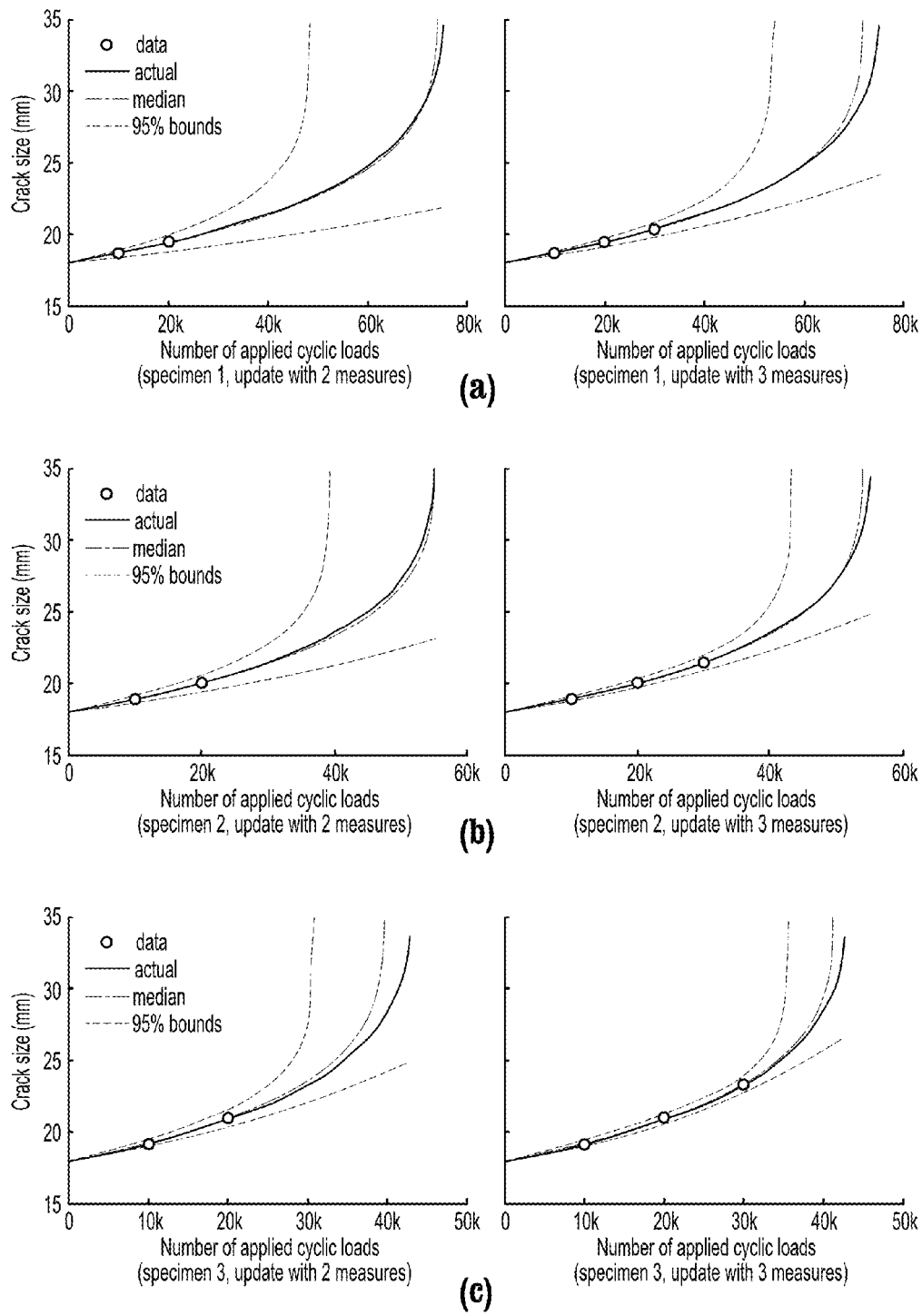

The results of the crack growth prognostics update using Paris' model are presented in FIGS. 3(a)-(c), and Forman's model and McEvily's model produce results given in FIGS. 4(a)-(b) and FIGS. 5(a)-(c), respectively. Each of FIGS. 3 to 5 show crack size vs. the number of applied cyclic load for specimen 1 in (a), specimen 2 in (b), and specimen 3 in (c). The median predictions and 95% bounds predictions are also shown. Although the three components have the same prior distribution, the final prognosis results for each of the components are different. As more and more measures are used for updating, the data become dominant and will eventually diminish the effect of the prior. From a practical point of view, according to embodiments of the disclosure, it is shown that reasonable prognostic results can be obtained using a prior based on partial information.

Figure 5:
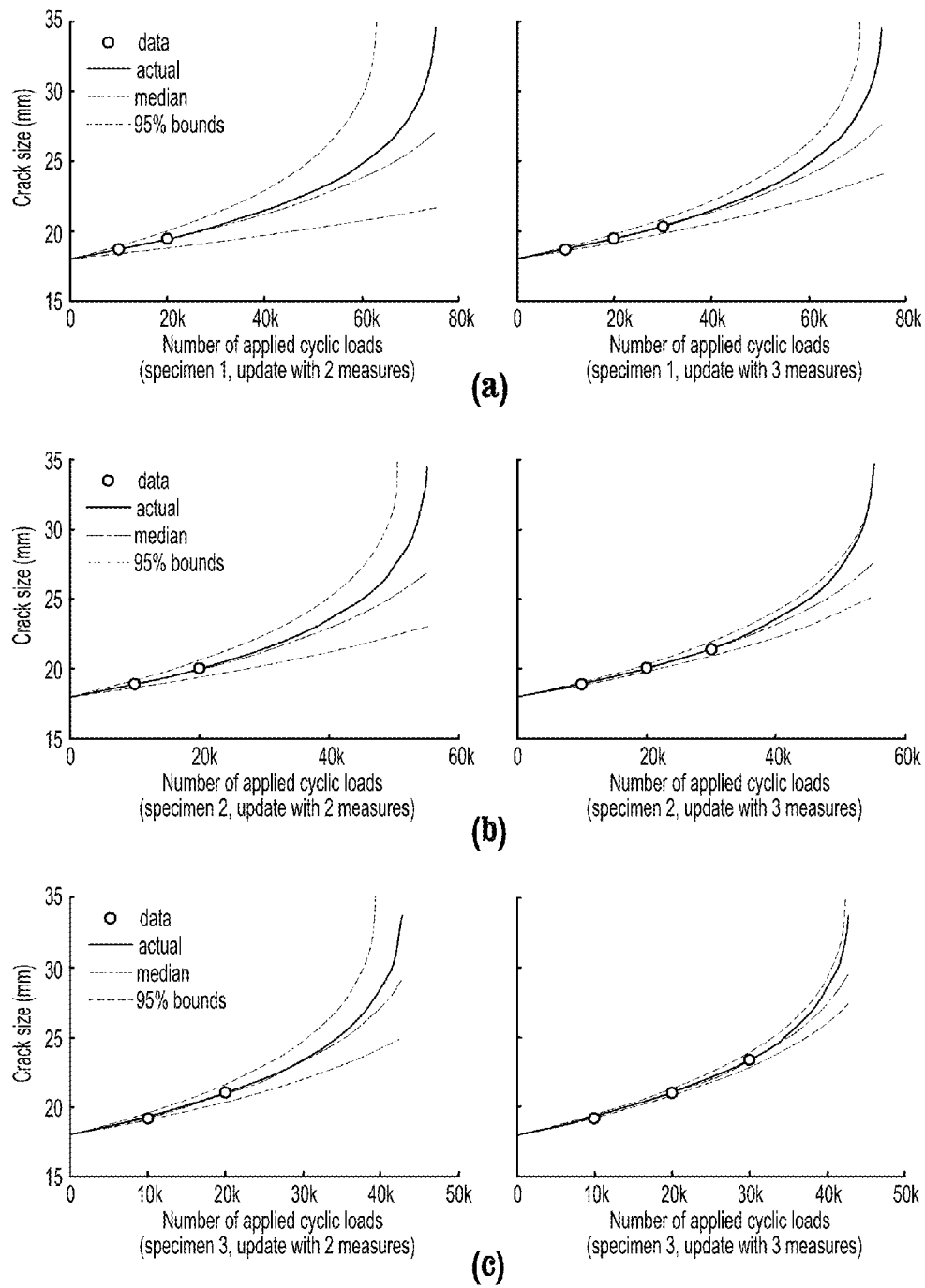

In realistic applications, a model according to embodiments of the disclosure is generally more sophisticated, however a prior distribution with an exponential model and no analytical solution might be slow for numerical evaluation of the posterior distribution. On the other hand, according to embodiments of the disclosure, if physical justification can be made for the form of the parameter distribution, it would be convenient to transform the samples to a particular type of distribution. For example, in the application shown above, it is appropriate to consider ln(c) as a normal variable and m as a truncated normal variable. MCMC samples after the first updating can be used to fit the distributions, however, fitting MCMC samples into an analytical distribution may introduce additional uncertainties and may be risky for prognostics and decision making Center-Through Thickness Cracked Specimen Testing Data and Prognostics Tests of embodiments of the disclosure also used the center-through cracked specimen testing data reported in Virkler, et al., "The statistical nature of fatigue crack propagation", J Eng. Mater. Technol. 1979; 101:148-153, the contents of which are herein incorporated by reference in their entirety, for 2024 T3 aluminum materials. The dataset comprises 68 sample trajectories, each containing 164 measurement points. The entire specimen has the same geometry, i.e., an initial crack size of 9 mm, length L=558.8 mm, width w=152.4 mm and thickness t=2.54 mm. The stress range during each experiment is constant $\Delta\sigma$=48.28 MPa, and the stress ratio is R=0.2. The failure criterion is that the crack size equals 49.8 mm. According to embodiments of the disclosure, five crack growth curves of center-through cracked specimens from the dataset are arbitrarily chosen to represent the target components and are shown in FIG. 5.

Figures 6, 7:
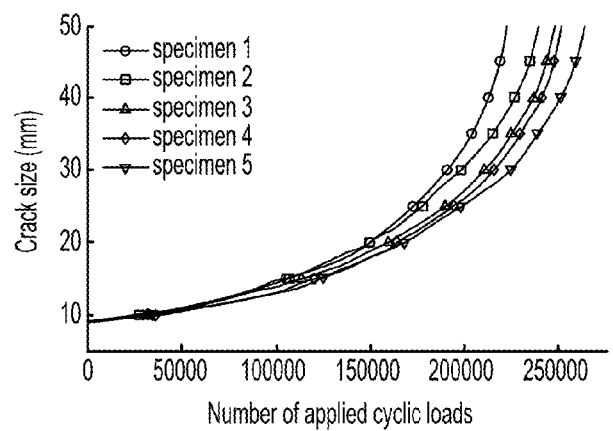
FIG. 6 depicts five crack growth curves of center-through cracked specimens, according to an embodiment of the disclosure.
FIG. 7 is a table of detailed values of $\bar{\alpha}_{\lambda_i}$ for different $\lambda_i$ center-through thickness specimen testing, according to an embodiment of the disclosure.
Figure 8:
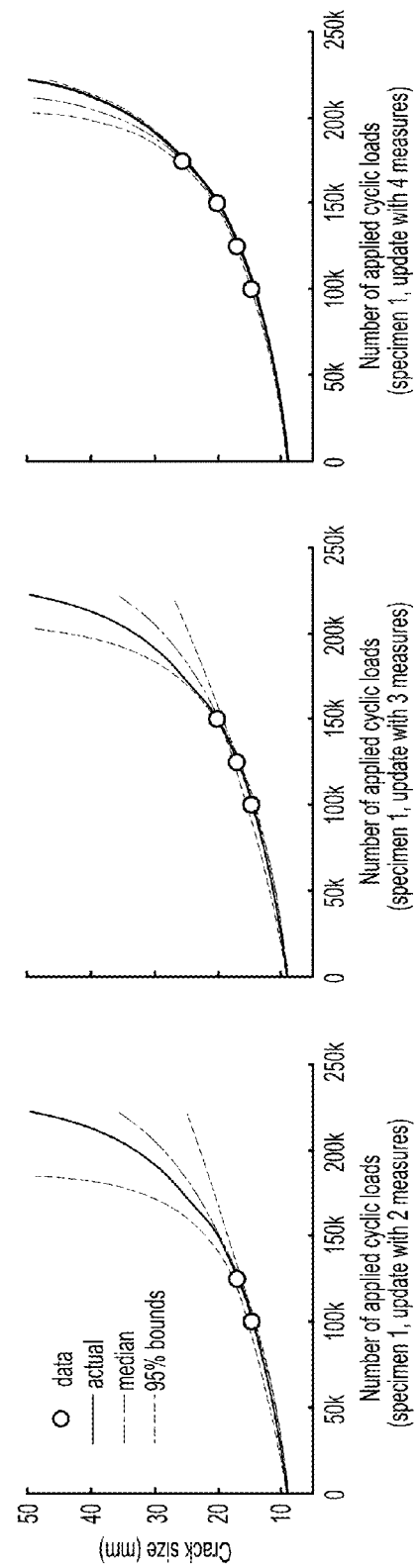
FIGS. 8 to 12 depict crack growth prognostics update using Paris' model for five specimens, according to an embodiment of the disclosure.
Figure 9:
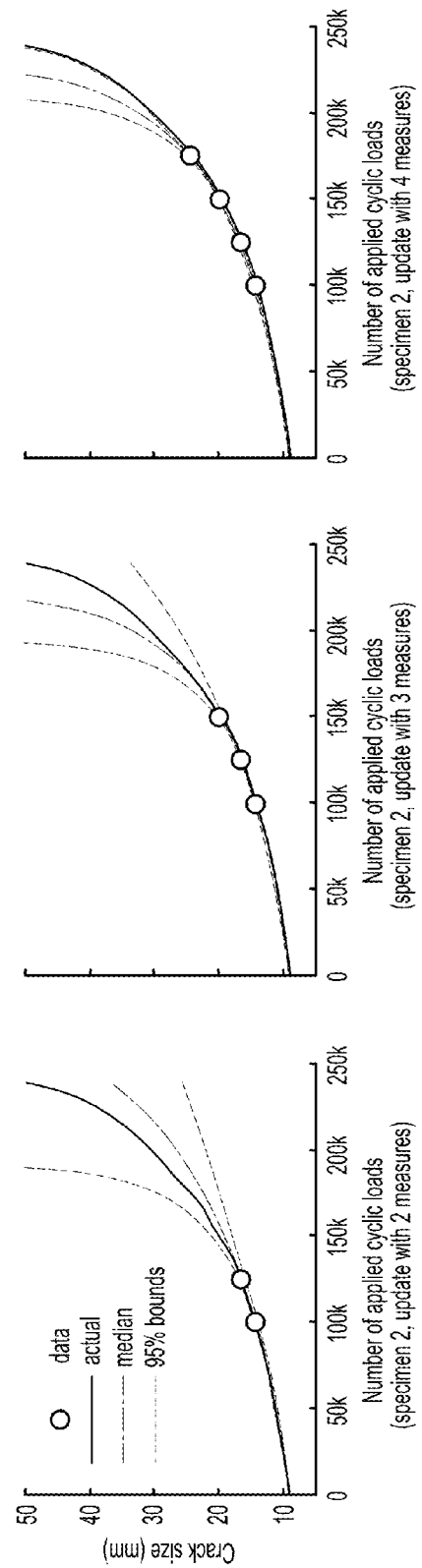
Figure 10:
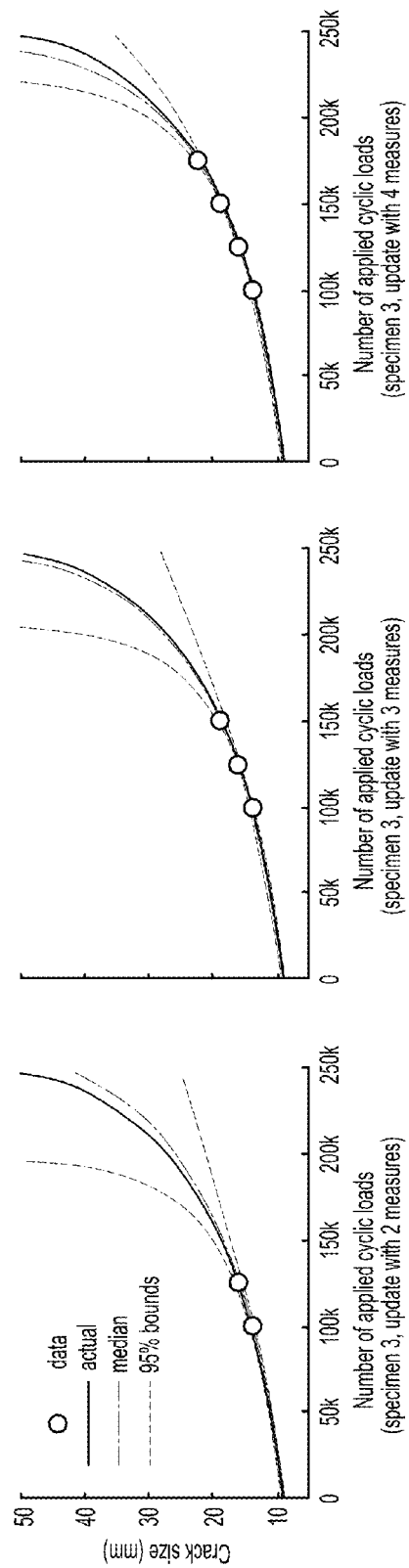
Figure 11:
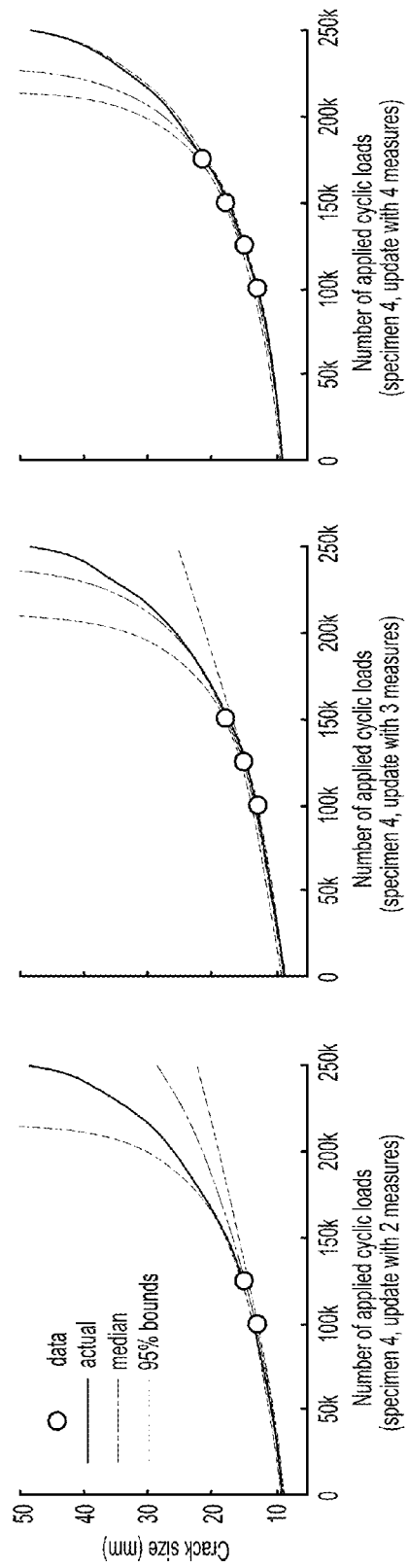
Figure 12:
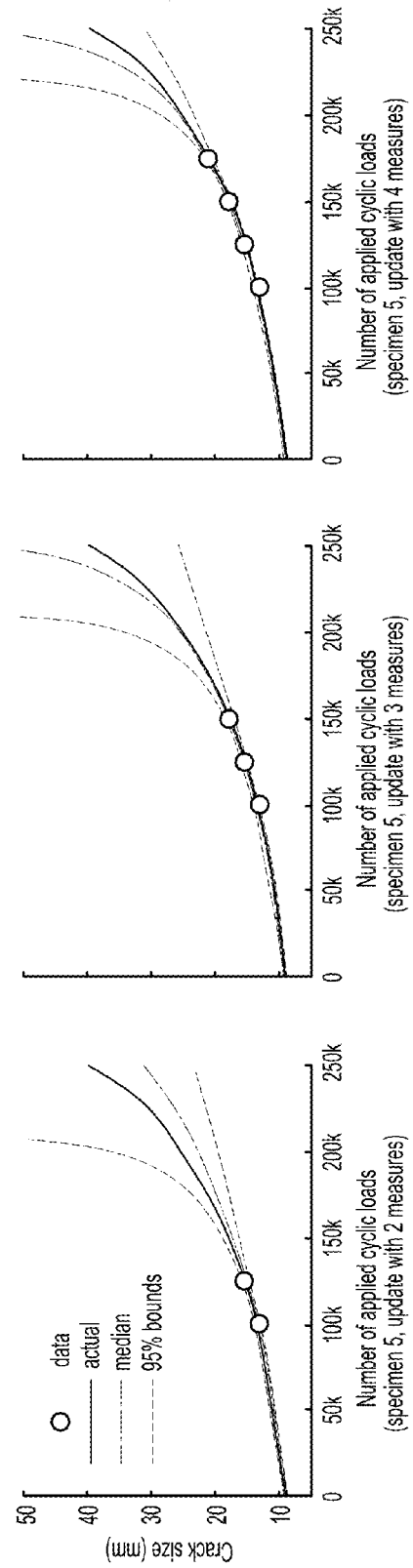

According to embodiments of the disclosure, assume the crack size for the five specimens at 100,000 cycles are measured. The crack lengths are 14.662 mm, 14.380 mm, 13.862 mm, 12.983 mm, and 12.998 mm for specimens 1-5, respectively. The mean value of the model output at 100,000 cycles is $\bar{\alpha}$=13.777 mm. Following a procedure according to embodiments of the disclosure as shown in the CT specimen dataset, the Lagrange multipliers $\lambda$ are obtained as −0.0316 mm, −0.0244 mm, and −0.0251 mm for Paris' model, Forman's model and McEvily's model, respectively. The detailed values of $\bar{\alpha}_{\lambda_j}$ for different $\lambda_j$ calculated using numerical quadrature are shown in the table of FIG. 7.

According to embodiments of the disclosure, four data points are chosen to represent the subsequent measurements to perform updating. For illustration purposes, only Paris' model results are presented here. Other models follow the same procedure as Paris' model. The results for fatigue crack growth associated with the five specimens are shown in FIGS. 8-12, with each figure showing crack size vs. number of applied cyclic loads. Although the five specimens share the same entropic prior distribution, the subsequent fatigue crack growth curves are quite different. As more measurement points are used to perform updating, the effect of the prior is gradually reduced. The 95% bounds of the crack growth curves also narrow, indicating the reduction of the prognostics uncertainty. In addition, the median prediction of the crack growth curves also become closer to the actual crack growth curve as more data points are used for updating.

System Implementations

It is to be understood that embodiments of the present disclosure can be implemented in various forms of hardware, software, firmware, special purpose processes, or a combination thereof. In one embodiment, the present disclosure can be implemented in software as an application program tangible embodied on a computer readable program storage device. The application program can be uploaded to, and executed by, a machine comprising any suitable architecture.

Figure 14:
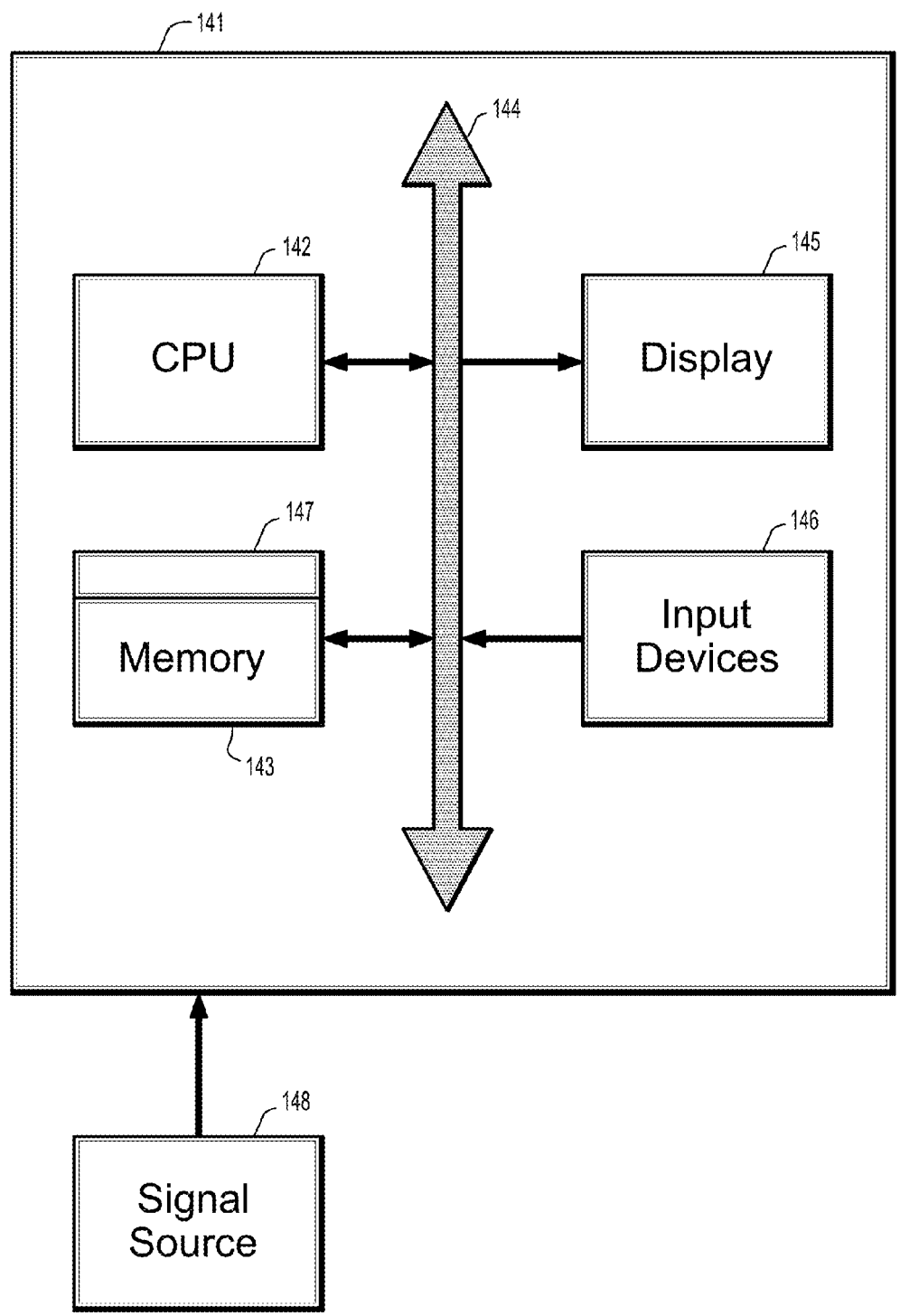
FIG. 14 is a block diagram of a system for probabilistic fatigue prognostics using partial information, according to an embodiment of the disclosure.

FIG. 14 is a block diagram of an exemplary computer system for implementing probabilistic fatigue prognostics using partial information according to an embodiment of the invention. Referring now to FIG. 14, a computer system 141 for implementing the present invention can comprise, inter alia, a central processing unit (CPU) 142, a memory 143 and an input/output (I/O) interface 144. The computer system 141 is generally coupled through the I/O interface 144 to a display 145 and various input devices 146 such as a mouse and a keyboard. The support circuits can include circuits such as cache, power supplies, clock circuits, and a communication bus. The memory 143 can include random access memory (RAM), read only memory (ROM), disk drive, tape drive, etc., or a combinations thereof. The present invention can be implemented as a routine 147 that is stored in memory 143 and executed by the CPU 142 to process the signal from the signal source 148. As such, the computer system 141 is a general purpose computer system that becomes a specific purpose computer system when executing the routine 147 of the present invention.

The computer system 141 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present disclosure has been described in detail with reference to exemplary embodiments, those skilled in the art will appreciate that various modifications and substitutions can be made thereto without departing from the spirit and scope of the disclosure as set forth in the appended claims.

What is claimed is:

1. A computer-implemented method for predicting fatigue crack growth in materials, comprising:
   providing, via a processor, a prior distribution obtained using response measures from one or more target components using a fatigue crack growth model as a constraint function;
   receiving, via the processor, new crack length measurements;
   generating, via the processor, a posterior distribution based on the new crack length measurements;
   sampling, via the processor, the posterior distribution for generating crack length measurement predictions,
   wherein the prior distribution is expressed as $p_0(\theta) \propto \exp\{\lambda M(\theta)\}$, wherein M is the fatigue crack growth model, $\theta$ is a fatigue crack growth model parameter, $M(\theta)$ is the output of the fatigue crack growth model, and $\lambda$ is a Lagrange multiplier, and the constraint function is expressed as $E_{p_0(\theta)}[M(\theta)] = \bar{\alpha}$, wherein $\bar{\alpha}$ is a mean of the response measures from one or more target components; and
   the posterior distribution is expressed as $$p(\theta) \propto \exp[\lambda M(\theta)] \exp\left\{-\frac{1}{2}\sum_{i=1}^{n}\left[\frac{a_i - M_i(\theta)}{\sigma_\varepsilon}\right]^2\right\},$$

where $a_i$ represents new crack length measurements associated with the one or more target components, $\sigma_\varepsilon$ is a standard deviation of Gaussian likelihood, and n is a total number of new crack length measurements; and
   wherein the Lagrange multiplier $\lambda$ is obtained by solving, via the processor, $$\frac{\partial \ln \int \lambda M(\theta) d\theta}{\partial \lambda} = \bar{a};$$

and
   predicting, via the processor, fatigue crack growth in the material based on the posterior distribution.

2. The computer-implemented method of claim 1, wherein the posterior distribution is sampled using a Markov-chain Monte-Carlo simulation.

3. The computer-implemented method of claim 1, wherein $\sigma_\varepsilon = \sqrt{\sigma_{\varepsilon_1}^2 + \sigma_{\varepsilon_2}^2}$, wherein $\sigma_{\varepsilon_1}$ is a standard deviation associated a statistical uncertainty of the fatigue crack growth model M, and $\sigma_{\varepsilon_2}$ is a standard deviation associated with a measurement uncertainty.

4. The computer-implemented method of claim 1, further comprising updating the posterior distribution as new crack length measurements are received.

5. The computer-implemented method of claim 1, wherein the fatigue crack growth model is Paris' model, expressed as $$\frac{da}{dN} = c(\Delta K)^m,$$

wherein a is a crack size, N is a number of applied cyclic loads, $$\Delta K = \sqrt{\pi a}\, \Delta\sigma\, g\!\left(\frac{a}{w}\right)$$

is a range of a stress intensity factor during one cycle, $\Delta\sigma$ is a range of the applied stress during one cycle, $g(a/w)$ is a geometric correction term, w is a width of the specimen, and c and m are model parameters.

6. The computer-implemented method of claim 1, wherein the fatigue crack growth model is Forman's model, expressed as $$\frac{da}{dN} = \frac{c(\Delta K)^m}{(1-R)K_{cr} - \Delta K},$$

wherein a is a crack size, N is a number of applied cyclic loads, $$\Delta K = \sqrt{\pi a}\, \Delta\sigma\, g\!\left(\frac{a}{w}\right)$$

is a range of a stress intensity factor during one cycle, $\Delta\sigma$ is a range of the applied stress during one cycle, $g(a/w)$ is a geometric correction term, w is a width of the specimen, $K_{cr}$ is a fracture toughness of the material, R is a load ratio, and c and m are model parameters.

7. The computer-implemented method of claim 1, wherein the fatigue crack growth model is McEvily's model, expressed as $$\frac{da}{dN} = c(\Delta K - \Delta K_{th})^2\left[1 - \frac{\Delta K}{K_{cr} - K_{max}}\right],$$

wherein a is a crack size, N is a number of applied cyclic loads, $$\Delta K = \sqrt{\pi a}\, \Delta\sigma\, g\!\left(\frac{a}{w}\right)$$

is a range of a stress intensity factor during one cycle, $\Delta\sigma$ is a range of the applied stress during one cycle, $g(a/w)$ is a geometric correction term, w is a width of the specimen, $K_{cr}$ is a fracture toughness of the material, $\Delta K_{th}$ is a threshold stress intensity range below which cracks either propagate at an extremely low rate or do not propagate at all, $K_{max}$ is a maximum stress intensity in one cyclic load, and c is a model parameter.

8. The computer-implemented method of claim 1, wherein the posterior distribution is sampled using a Markov-chain Monte-Carlo simulation.

9. A computer-implemented method for predicting fatigue crack growth in materials, comprising:
   providing, via a processor, a prior distribution subject to a constraint function obtained using response measures from one or more target components, wherein the prior distribution is expressed as $p_0(\theta) \propto \exp\{\lambda M(\theta)\}$, wherein M is the fatigue crack growth model, $\theta$ is a fatigue crack growth model parameter, $M(\theta)$ is the output of the fatigue crack growth model, and $\lambda$ is a Lagrange multiplier is obtained by solving $$\frac{\partial \ln \int \lambda M(\theta) d\theta}{\partial \lambda} = \overline{a},$$

wherein $\overline{\alpha}$ is a mean of the response measures from one or more target components, and a constraint function is expressed as $E_{p_0(\theta)}[M(\theta)]=\overline{\alpha}$;

generating, via the processor, a posterior distribution based on the prior distribution function, and predicting, via the processor, fatigue crack growth based on the posterior distribution.

10. The computer-implemented method of claim 9, further comprising:

receiving new crack length measurements;

providing a posterior distribution obtained using the new crack length measurements, wherein the posterior distribution is expressed as $$p(\theta) \propto \exp[\lambda M(\theta)] \exp\left\{-\frac{1}{2}\sum_{i=1}^{n}\left[\frac{a_i - M_i(\theta)}{\sigma_\varepsilon}\right]^2\right\},$$

wherein $a_i$ represents new crack length measurements associated with the one or more target components, $\sigma_\varepsilon = \sqrt{\sigma_{\varepsilon_1}^2 + \sigma_{\varepsilon_2}^2}$ is a standard deviation of Gaussian likelihood wherein $\sigma_{\varepsilon_1}$ is a standard deviation associated a statistical uncertainty of the fatigue crack growth model M and $\sigma_{\varepsilon_2}$ is a standard deviation associated with a measurement uncertainty, and n is a total number of new crack length measurements; and updating the posterior distribution as new crack length measurements are received.

11. The computer-implemented method of claim 10, further comprising sampling the posterior distribution to obtain crack length measurement predictions, wherein the posterior distribution is sampled using a Markov-chain Monte-Carlo simulation.

12. A non-transitory program storage device readable by a computer, tangibly embodying a program of instructions executed by the computer to perform the method steps for predicting fatigue crack growth in materials, the method comprising the steps of:

providing a prior distribution obtained using response measures from one or more target components using a fatigue crack growth model as a constraint function;

receiving new crack length measurements;

generating a posterior distribution based on the new crack length measurements;

sampling the posterior distribution for generating crack length measurement predictions, wherein the prior distribution is expressed as $p_0(\theta) \propto \exp\{\lambda M(\theta)\}$, wherein M is the fatigue crack growth model, $\theta$ is a fatigue crack growth model parameter, $M(\theta)$ is the output of the fatigue crack growth model, and $\lambda$ is a Lagrange multiplier, and the constraint function is expressed as $E_{p_0(\theta)}[M(\theta)]=\overline{\alpha}$, wherein $\overline{\alpha}$ is a mean of the response measures from one or more target components; and the posterior distribution is expressed as $$p(\theta) \propto \exp[\lambda M(\theta)] \exp\left\{-\frac{1}{2}\sum_{i=1}^{n}\left[\frac{a_i - M_i(\theta)}{\sigma_\varepsilon}\right]^2\right\},$$

where $a_i$ represents new crack length measurements associated with the one or more target components, $\sigma_\varepsilon$ is a standard deviation of Gaussian likelihood, and n is a total number of new crack length measurements; and wherein the Lagrange multiplier $\lambda$ is obtained by solving $$\frac{\partial \ln \int \lambda M(\theta) d\theta}{\partial \lambda} = \overline{a};$$

and predicting fatigue crack growth based on the posterior distribution.

13. The computer readable program storage device of claim 12, wherein the posterior distribution is sampled using a Markov-chain Monte-Carlo simulation.

14. The computer readable program storage device of claim 12, wherein $\sigma_\varepsilon = \sqrt{\sigma_{\varepsilon_1}^2 + \sigma_{\varepsilon_2}^2}$, wherein $\sigma_{\varepsilon_1}$ is a standard deviation associated a statistical uncertainty of the fatigue crack growth model M, and $\sigma_{\varepsilon_2}$ is a standard deviation associated with a measurement uncertainty.

15. The computer readable program storage device of claim 12, the method further comprising updating the posterior distribution as new crack length measurements are received.

16. The computer readable program storage device of claim 12, wherein the fatigue crack growth model is Paris' model, expressed as $$\frac{da}{dN} = c(\Delta K)^m,$$

wherein a is a crack size, N is a number of applied cyclic loads, $$\Delta K = \sqrt{\pi a}\, \Delta \sigma g\left(\frac{a}{w}\right)$$

is a range of a stress intensity factor during one cycle, $\Delta \sigma$ is a range of the applied stress during one cycle, $g(a/w)$ is a geometric correction term, w is a width of the specimen, and c and m are model parameters.

17. The computer readable program storage device of claim 12, wherein the fatigue crack growth model is Forman's model, expressed as $$\frac{da}{dN} = \frac{c(\Delta K)^m}{(1-R)K_{cr} - \Delta K},$$

wherein a is a crack size, N is a number of applied cyclic loads, $$\Delta K = \sqrt{\pi a}\, \Delta \sigma g\left(\frac{a}{w}\right)$$

is a range of a stress intensity factor during one cycle, $\Delta \sigma$ is a range of the applied stress during one cycle, $g(a/w)$ is a geometric correction term, w is a width of the specimen, $K_{cr}$ is a fracture toughness of the material, R is a load ratio, and c and m are model parameters.

18. The computer readable program storage device of claim 12, wherein the fatigue crack growth model is McEvily's model, expressed as $$\frac{da}{dN} = c(\Delta K - \Delta K_{th})^2 \left[1 - \frac{\Delta K}{K_{cr} - K_{max}}\right],$$

wherein a is a crack size, N is a number of applied cyclic loads, $$\Delta K = \sqrt{\pi a} \, \Delta \sigma g\left(\frac{a}{w}\right)$$

is a range of a stress intensity factor during one cycle, $\Delta\sigma$ is a range of the applied stress during one cycle, g(a/w) is a geometric correction term, w is a width of the specimen, $K_{cr}$ is a fracture toughness of the material, $\Delta K_{th}$ is a threshold stress intensity range below which cracks either propagate at an extremely low rate or do not propagate at all, $K_{max}$ is a maximum stress intensity in one cyclic load, and c is a model parameter.

* * * * *